United States Patent [19]

Hechenbleikner et al.

[11] E Re. 29,098

[45] Reissued Jan. 4, 1977

[54] PREPARATION OF ALIPHATIC PHOSPHATES

[75] Inventors: Ingenuin Hechenbleikner; William Palmer Enlow, both of Chicago, Ill.

[73] Assignee: Borg-Warner Corporation, Chicago, Ill.

[22] Filed: Feb. 6, 1976

[21] Appl. No.: 655,648

Related U.S. Patent Documents

Reissue of:

[64] Patent No.: 3,923,620
Issued: Dec. 2, 1975
Appl. No.: 507,632
Filed: Sept. 20, 1974

[52] U.S. Cl. ..... 204/158 R

[51] Int. Cl.[2] ..... B01J 1/10

[58] Field of Search ..... 204/158 R

[56] References Cited

UNITED STATES PATENTS 2,736,695 2/1956 Colfee ..... 204/158 R

*Primary Examiner*—Howard S. Williams
*Attorney, Agent, or Firm*—Joseph Shekleton

[57] ABSTRACT

A process for the preparation of trialkyl and trialkenyl phosphates. The process involves oxidation of the corresponding phosphite with oxygen or an oxygen-containing gas. The oxidation is catalyzed by a nonoxidizing initiator such as an organic peroxide or an azo compound, and requires the influence of ultraviolet light for optimum performance.

7 Claims, No Drawings

PREPARATION OF ALIPHATIC PHOSPHATES

Matter enclosed in heavy brackets [ ] appears in the original patent but forms no part of this reissue specification; matter printed in italics indicates the additions made by reissue.

This invention relates to a process for the preparation of aliphatic phosphates by means of the oxidation of certain trialkenyl phosphites or trialkyl phosphites. More particularly, it relates to such a process which avoids high temperatures and yet results in very good yields.

The aliphatic phosphates made available by this invention are useful as plasticizers, gasolines additives, lubricant additives and flame-retarding additives. The trialkenyl phosphates are excellent cross-linking agents in the curing of ethylene polymers such as low density polyethylene or EPDM polymers.

The conversion of tertiary phosphites to the corresponding phosphates via oxidation affords a convenient method of synthesis of these desirable products. They can also be prepared by the reaction of phosphorus oxychloride with the appropriate alcohol, and this synthesis has been used, but it involves the elimination of large amounts of hydrogen chloride which is both wasteful of chlorine and corrosive, requiring special equipment. The oxidation of phosphites is a preferred method.

Early oxidative methods of preparing tertiary phosphates involved treatment of the corresponding tertiary phosphites with air (Zimmerman, Ann. 175, 1 (1875)) and with a combination of air and sulfur trioxide (Buchheim, U.S. Pat. No. 2,059,084). Later developments, as taught by Hechenbleikner in U.S. Pat. No. 2,851,476, involved the use of hydrogen peroxide in an aqueous alkaline medium, but this suffered from the disadvantage of hydrolysis of the phosphite (because of the presence of water) and the need for careful control of pH.

Hodan et al., U.S. Pat. No. 3,136,804, and Baranauckas et al., U.S. Pat. No. 3,136,805, show the oxidation of trialkenyl and trialkyl phosphites, respectively, to the corresponding phosphates by the action of oxygen in an anhydrous medium, using a metal oxide such as aluminum oxide as a catalyst, yields of 88–96% are obtained and losses due to hydrolysis are avoided because of the absence of water in the oxidation mixture. The oxidations are carried out at temperatures between 60° C and 180° C, preferably between 100° C and 125° C, and for a period of time ranging from two to seven hours.

Similarly, Baranauckas et al., U.S. Pat. No. 3,333,030, show the oxidation of secondary phosphites such as dimethyl or diphenyl phosphite by means of oxygen in the presence of a catalyst such as copper or copper oxide. The products are a mixture of the corresponding primary and secondary phosphates. Reaction temperatures are generally above 100° C, although slightly lower temperatures are also suggested.

Still another method of oxidizing tertiary olefinic phosphites to the corresponding phosphates by means of air is shown in Hodan et al., U.S. Pat. No. 3,334,158. The method involves a short residence time, i.e., less than 20 minutes and preferably less than 5 minutes, in the reaction zone. The temperature is above 100° C, preferably between 130° C and 190° C. The reaction zone is a column packed with protruded stainless steel.

All of these processes must be carried out at relatively high temperatures; some require rather careful and precise control of reaction conditions. Those which give best yields require more care than the others. A low temperature process which affords good yields of tertiary phosphite, with minimum required attention to process conditions, is desirable.

It is accordingly a principal object of the present invention to provide an improved process for preparing aliphatic phosphates.

Another object is to provide such a process which is effective at relatively low temperatures.

Still another object is to provide such a process which results in good yields of trialkyl or trialkenyl phosphates.

These and other objects are accomplished by a process for preparing aliphatic phosphates comprising introducing oxygen into a mixture of a trialkenyl or trialkyl phosphite and a source of free radicals, at a temperature below about 80° C and in the presence of light of wavelength of 2000–4000A°. Yields of tertiary phosphate are very good, i.e., virtually quantitative in most cases, and the process requires no unusual attention.

The trialkenyl or trialkyl phosphite may be defined in terms of a structural formula, as follows:

$$P \begin{matrix} O-R \\ O-R \\ O-R \end{matrix}$$

where R is alkyl or alkenyl, each containing 1–20 carbon atoms. Illustrative alkyl groups include methyl, ethyl, n-propyl, isopropyl, n-butyl, isobutyl, n-amyl, sec-amyl, n-hexyl, isohexyl, 2-methylamyl-4, 2-ethylhexyl, n-octyl, isooctyl, n-dodecyl, n-tetradecyl, n-octadecyl, and eicosyl. Illustrative alkenyl radicals include allyl, methallyl, crotyl, pentenyl-2,3, 3-dimethallyl and 2,3-dimethallyl.

The oxygen may be used as such, i.e., without dilution, or it may be diluted, as in air. Ordinarily the oxygen is bubbled into the phosphite, either neat or in a solvent, until the mixture is completely oxidized. This end point is shown by testing with iodine which is reactive with any unreacted phosphite, and a negative test indicates completion of the reaction.

Alternatively, the reactor vessel may be evacuated to about 5 mm. Hg and oxygen fed in on demand, i.e., oxygen is introduced only as fast as it is consumed by the oxidation reaction.

A solvent may be used but it is not necessary. Heptane is a suitable solvent.

The source of free radicals is a class of compounds generally known as non-oxidizing initiators. They include principally organic peroxides and azo compounds having less than 30 carbon atoms, and of these the aliphatic initiators are preferred. Illustrative examples of such peroxides include di-tert-butyl peroxide, alpha, alpha-bis (tert-butylperoxy) diisopropylbenzene, diacetone alcohol peroxide, dicumyl peroxide, 1,1-di-tert-butyl-3,3,5-trimethylcyclohexane, and 2,5-dimethyl-2,5-di(tert-butylperoxy)hexane.

The term "aliphatic" as used to describe these peroxides defines the peroxide linkages, i.e., the carbon atoms to which the peroxide group is attached. These carbon atoms are aliphatic carbon atoms. Thus, as illustrative above, an "aliphatic" peroxide may or may not contain aromatic groups. Dicumyl peroxide, for example, although it is an aromatic compound, is herein classified as an aliphatic peroxide because the carbon atoms to which

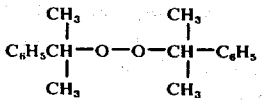

dicumyl peroxide the peroxide group is attached are aliphatic carbon atoms.

Illustrative examples of preferred azo compounds include alpha-cyano azo compounds, conforming to the structural formula

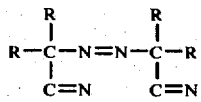

where R are the same or different alkyl or phenyl radicals having 1–6 carbon atoms. Bis-azo isobutyronitrile (where all four R's are methyl) is particularly illustrative.

The temperature of the oxidation reaction mixture may range from about 0° C to about 80° C. Higher temperatures are wholly unnecessary and, in fact, the oxidation proceeds quite satisfactorily, with near-quantitative yields, at lower temperatures than 80° C. Preferably, the oxidiation temperature is within the range of from about 10° C to about 60° C, and in most instances a range of from about 10° C to about 50° C is suitable. The oxidation is exothermic and it is necessary to cool the reaction mixture to maintain the temperature at a desired level.

The amount of peroxide or azo compound used in the oxidation reaction may range from about 0.01% to about 5.0%. More than 5.0% can of course be used with no harmful effect, but with no added advantage. Ordinarily it is preferred to use from about 0.1% to about 2.0% of the peroxide or azo compound.

The reaction must be carried out in the presence of ultraviolet light, i.e., light having wavelength between 2000A° and 4000A°. Light of wavelength between 2000A° and 2500A° is especially effective. The light serves to activate the free radical source, i.e., it causes decomposition of the non-oxidizing initiator to yield a free radical which in turn catalyzes oxidation of the trialkenyl phosphite. Ordinary sunlight will serve the purpose and in many instances is satisfactory. Preferably, however, an ultraviolet lamp is positioned alongside the reactor to provide relatively intense ultraviolet irradiation.

The reaction involves simply contacting the trialkenyl or trialkyl phosphite with oxygen as above, with or without a solvent such as heptane, and then isolating the phosphate product. Where no solvent is employed, it may be unnecessary to isolate the product inasmuch as the product mixture consists almost entirely of phosphate and may be sufficiently pure for the particular purpose.

The process of the invention is illustrated further by the following examples which, however, are not to be taken as limiting in any respect. All parts and percentages herein are by weight unless otherwise expressly stated.

EXAMPLE 1

A mixture of 0.5 ml. of di-tert-butyl peroxide and 120 ml. of triisoctyl phosphite are placed in a vertical cylindrical vessel surrounded with 16 high-intensity ultraviolet lamps, and containing internal cooling coils and a gas inlet tube fitted with a fritted disc opening. Water at 50° C is circulated through the cooling coils while oxygen is bubbled in through the gas inlet tube for 2.5 hours. The resulting product is substantially pure triisooctyl phosphate comprising a yield of greater than 99% of the theory.

EXAMPLE 2

A mixture of 0.5 g. of bis-azo isobutyronitrile and 120 ml. of triisoamyl phosphite are placed in the above reactor and treated as there described, except that the temperature of the circulating water is such as to maintain the temperature of the oxidation mixture at 35°–40° C. The yield of substantially pure triisoamyl phosphate is about 99% of the theory.

EXAMPLE 3

Triallyl phosphite is converted to triallyl phosphate quantitatively by the method of Example 1.

EXAMPLE 4

Trimethyl phosphite is converted to trimethyl phosphate by the method of Example 1. The yield is 97% of the theory.

EXAMPLE 5

Triisodecyl phosphite is converted to triisodecyl phosphate by the method of Example 1. The yield is 95% of the theory.

I claim:

1. A process for preparing aliphatic phosphates comprising introducing oxygen into a mixture of a trialkenyl or trialkyl phosphite and a source of free radicals, at a temperature below about 80° C and in the presence of light of wavelength of 2000–4000A°.

2. The process of claim 1 wherein the source of free radicals is a non-oxidizing organic peroxide.

3. The process of claim 1 wherein the source of free radicals is a dialkyl peroxide.

4. The process of claim 1 wherein the source of free radicals is di-tert-butyl peroxide.

5. The process of claim 1 wherein the phosphite is triallyl phosphite.

6. The process of claim 1 wherein the temperature is within the range of from about 10° C to about 60° C.

7. The process of claim 1 wherein the wavelength of the light is 2000–2500A°.

* * * * *